(12) United States Patent
Kim et al.

(10) Patent No.: US 11,054,690 B2
(45) Date of Patent: Jul. 6, 2021

(54) METHOD OF FABRICATING A DISPLAY PANEL AND A DISPLAY DEVICE WITH THE DISPLAY PANEL

(71) Applicant: Samsung Display Co., Ltd., Yongin-si (KR)

(72) Inventors: Min-uk Kim, Daejeon (KR); Eun-ae Kwak, Gunpo-si (KR); Junho Song, Seongnam-si (KR); Youngje Cho, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/190,154

(22) Filed: Nov. 14, 2018

(65) Prior Publication Data
US 2019/0146270 A1    May 16, 2019

(30) Foreign Application Priority Data

Nov. 15, 2017    (KR) .................. 10-2017-0152592

(51) Int. Cl.
*G02F 1/1335* (2006.01)
*G02F 1/13357* (2006.01)

(52) U.S. Cl.
CPC .. *G02F 1/133528* (2013.01); *G02F 1/133512* (2013.01); *G02F 1/133617* (2013.01);
(Continued)

(58) Field of Classification Search
CPC ......... G02F 1/133528; G02F 1/133512; G02F 1/133617; G02F 2201/30;
(Continued)

(56) References Cited

U.S. PATENT DOCUMENTS

| 8,294,848 B2 | 10/2012 | Cho et al. |
| 8,547,504 B2 | 10/2013 | Guo et al. |

(Continued)

FOREIGN PATENT DOCUMENTS

| KR | 10-2007-0076286 | 7/2007 |
| KR | 10-2007-0077677 | 7/2007 |

(Continued)

OTHER PUBLICATIONS

Sang-Shin Lee et al., "Polarization-tuned Dynamic Color Filters Incorporating a Dielectric-loaded Aluminum Nanowire Array", Jul. 27, 2015, Scientific Reports, vol. 5, Article No. 12450, Springer Nature Limited.

*Primary Examiner* — Shan Liu
(74) *Attorney, Agent, or Firm* — H.C. Park & Associates, PLC

(57) ABSTRACT

A display device including a display panel and a light source to irradiate to the display panel a first color light having a peak wavelength within a specific wavelength range. The display panel includes a first display substrate, a second display substrate facing the first display substrate and including a base substrate, a metal layer, which includes metal grid patterns disposed on the base substrate, and a color conversion layer, which is disposed on the base substrate to cover the metal grid patterns, and a liquid crystal layer provided between the first and second display substrates. The metal grid patterns are configured to block a fraction of an ambient incident light that is in a specific wavelength range, and a peak wavelength of the first color light is within the specific wavelength range.

18 Claims, 13 Drawing Sheets

(52) U.S. Cl.
CPC .. *G02F 1/133531* (2021.01); *G02F 1/133548* (2021.01); *G02F 1/133553* (2013.01); *G02F 2201/30* (2013.01)

(58) Field of Classification Search
CPC ........ G02F 2001/133531; G02F 2001/133548;
G02F 1/133553; G02F 1/1336; G02F
2001/133607; G02F 2001/133616; G02F
1/133606; G02F 1/133504; G02F
1/133615; G02F 1/133308; G02F
2001/133317; G02F 2001/133322; G02F
1/0311; G02F 1/116; G02F 1/1335; G02F
1/133536; G02F 1/13362; G02F
1/133533; G02F 2001/133521; G02F
2001/13356; G02F 2001/133538; G02F
2001/133541; G02F 2001/133543; G02F
2001/133545; G02F 2001/133355; G02F
2001/133562; G02F 2001/133567; G02F
2203/16; G02B 6/0088; G02B 6/005;
G02B 6/0068; G02B 6/0073; G02B
6/0083; G02B 5/3033; G02B 6/0056;
G02B 6/02109; B29D 11/00644; B32B
17/10458; B32B 2307/42; H01L 51/5293;
H01R 12/7005; H04B 10/532; G01J
5/0825; G03F 9/7065; G01R 33/3678;
C09K 19/0208
USPC ........................................ 349/61–64, 96–103
See application file for complete search history.

(56) References Cited

U.S. PATENT DOCUMENTS

| | | | |
|---|---|---|---|
| 2006/0210708 A1 | 9/2006 | Rho | |
| 2008/0036367 A1* | 2/2008 | Eida | H01L 27/322 313/504 |
| 2008/0100781 A1* | 5/2008 | Choo | G02F 1/133536 349/96 |
| 2010/0201909 A1* | 8/2010 | Jung | G02F 1/133617 349/61 |
| 2012/0013654 A1* | 1/2012 | Yashiro | G02F 1/133617 345/690 |
| 2012/0206678 A1* | 8/2012 | Kim | G02F 1/133533 349/106 |
| 2014/0146391 A1* | 5/2014 | Jang | G02B 5/3058 359/485.05 |
| 2014/0160396 A1* | 6/2014 | Chung | G02F 1/13362 349/62 |
| 2014/0160408 A1* | 6/2014 | Cho | G02F 1/133617 349/110 |
| 2014/0368766 A1* | 12/2014 | Shibata | G02F 1/133617 349/61 |
| 2015/0331278 A1* | 11/2015 | Araki | G02F 1/1362 349/61 |
| 2016/0026034 A1* | 1/2016 | Nam | G02F 1/133528 349/43 |
| 2016/0313601 A1* | 10/2016 | Nam | G02F 1/133512 |
| 2017/0031205 A1 | 2/2017 | Lee | |
| 2017/0082892 A1 | 3/2017 | Chung | |
| 2017/0123317 A1* | 5/2017 | Kamura | G02B 5/201 |
| 2017/0205550 A1* | 7/2017 | Zhu | G02F 1/133528 |
| 2017/0242292 A1 | 8/2017 | Jeon et al. | |
| 2018/0022133 A1 | 1/2018 | Kim et al. | |
| 2019/0025641 A1* | 1/2019 | Zhao | G02F 1/133514 |
| 2019/0196290 A1* | 6/2019 | Shih | G02F 1/133528 |
| 2020/0012028 A1* | 1/2020 | Lin | G02F 1/133512 |

FOREIGN PATENT DOCUMENTS

| | | |
|---|---|---|
| KR | 10-2010-0111103 | 10/2010 |
| KR | 10-2017-0014755 | 2/2017 |
| KR | 10-2017-0026823 | 3/2017 |
| KR | 10-2017-0034055 | 3/2017 |
| KR | 10-2017-0099026 | 8/2017 |

* cited by examiner

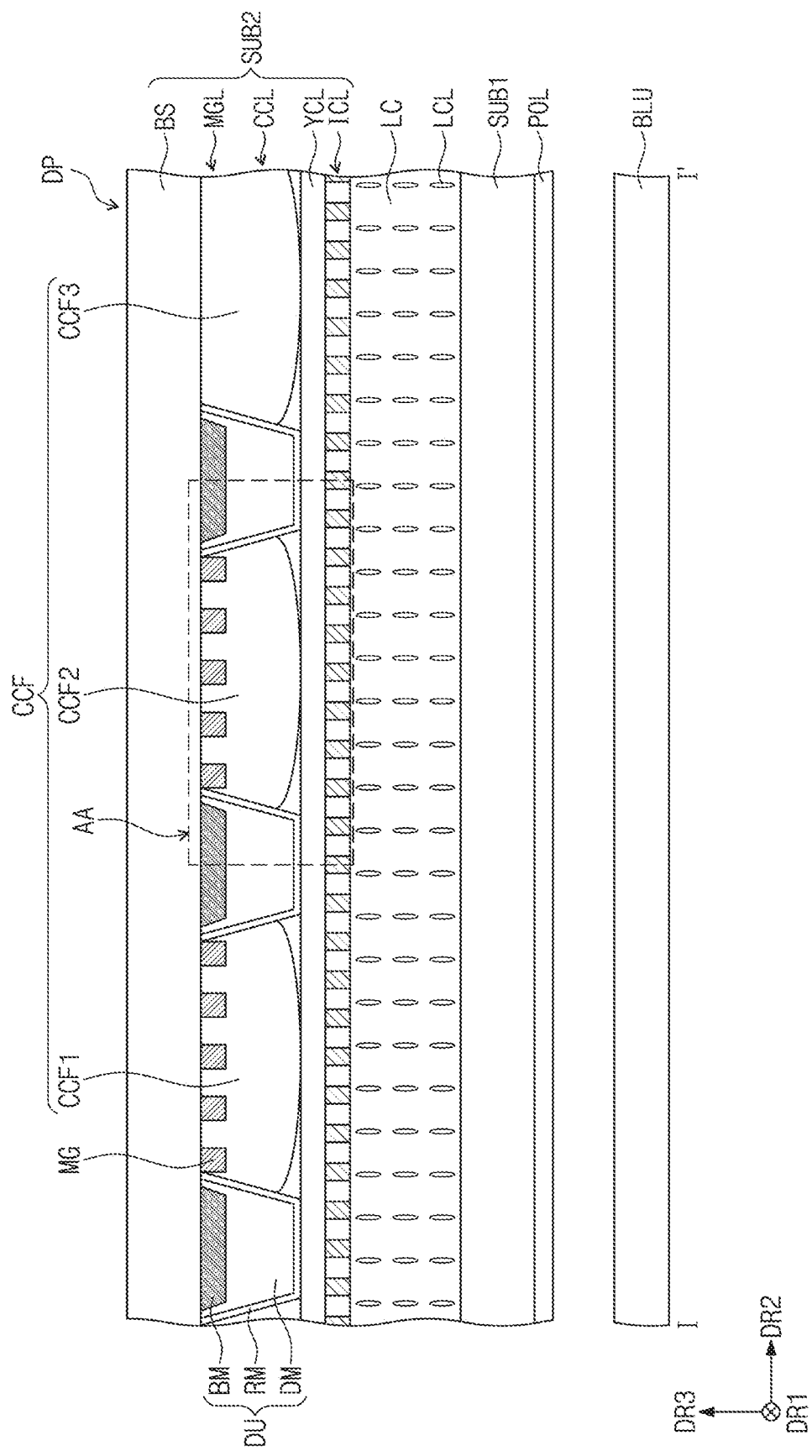

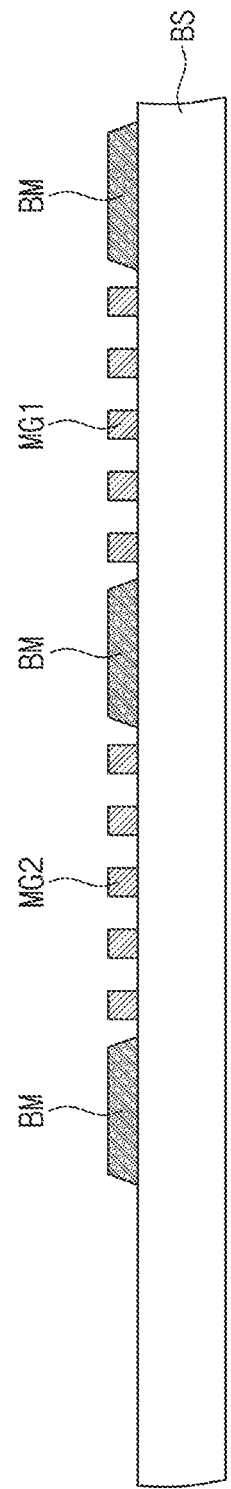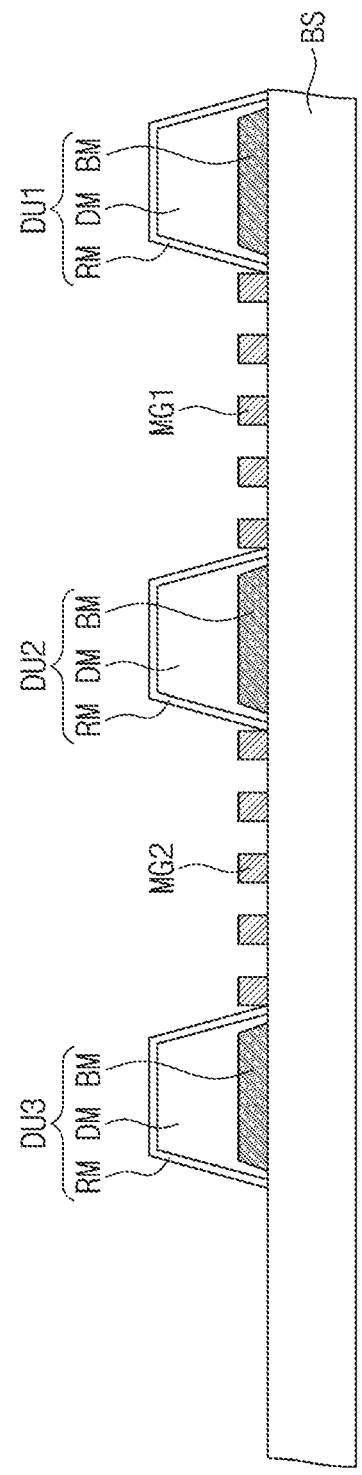

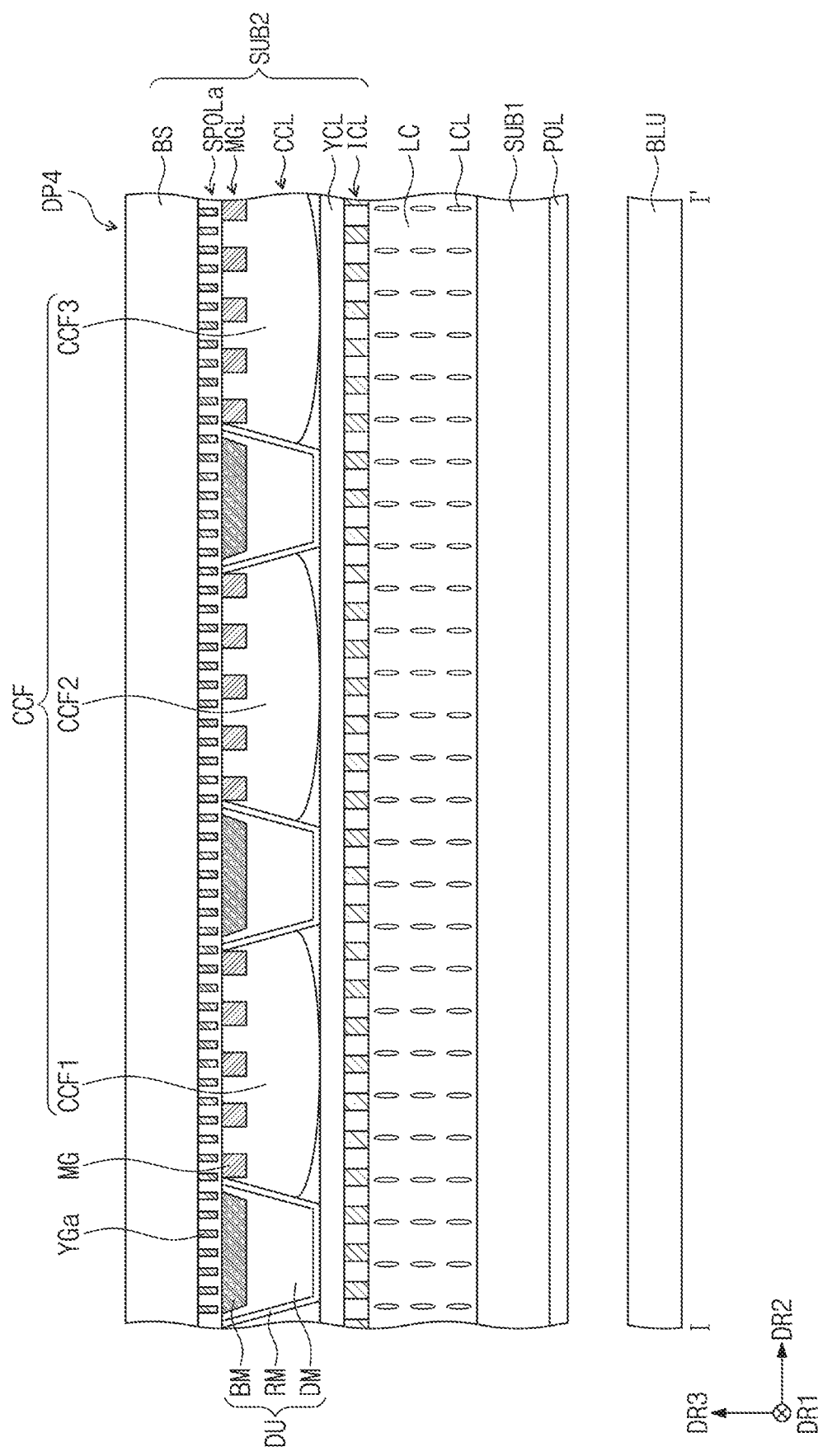

METHOD OF FABRICATING A DISPLAY PANEL AND A DISPLAY DEVICE WITH THE DISPLAY PANEL

CROSS REFERENCE TO RELATED APPLICATION

This application claims priority from and the benefit of Korean Patent Application No. 10-2017-0152592, filed on Nov. 15, 2017, which is hereby incorporated by reference for all purposes as if fully set forth herein.

BACKGROUND

Field

The invention generally relates to a display device, and in particular, to a method of fabricating a display panel and a display device with the display panel.

Discussion of the Background

Various display devices are being developed for use in multimedia devices such as televisions, mobile phones, tablet computers, navigation systems, gaming machines, and the like. In recent years, a photo-luminescent liquid crystal display having a high optical efficiency and an improved color balance property is being developed.

Due to optical problems such as reflection and scattering, there is technical difficulty in using a display device in an outdoor environment where external light such as ambient light is abundant. In order to overcome such a limitation, a polarizing member in which a polarizer and a phase retardation layer are combined has been used in a display device.

The above information disclosed in this Background section is only for understanding of the background of the inventive concepts, and, therefore, it may contain information that does not constitute prior art.

SUMMARY

Display panels constructed according to exemplary embodiments of the invention, methods of fabricating the display panel, and display devices including the display panel reduce or prevent ambient light incident upon the display from interacting with a color conversion layer and thereby adversely affecting the display.

According to one aspect of the invention, an exemplary embodiment of a display device includes a display panel and a light source to irradiate to the display panel a first color light having a peak wavelength within a specific wavelength range. The display panel may include a first display substrate, a second display substrate facing the first display substrate and including a base substrate, a metal layer having metal grid patterns disposed on the base substrate to block a fraction of an externally incident light in the specific wavelength range, and a color conversion layer disposed on the base substrate covering the metal grid patterns, and a liquid crystal layer disposed between the first display substrate and the second display substrate.

The color conversion layer may include a first conversion part including a first luminous body configured to absorb the first color light and emit a second color light, a second conversion part including a second luminous body configured to absorb the first color light and emit a third color light, and a third conversion part configured to allow the first color light to pass therethrough.

The metal grid patterns may include first metal grid patterns directly disposed on the base substrate and overlapping the first conversion part, and second metal grid patterns directly disposed on the base substrate and overlapping the second conversion part.

The metal grid patterns may further include a third metal grid pattern directly disposed on the base substrate and overlapping the third conversion part.

The second display substrate may further include a plurality of dam portions disposed between the first, second, and third conversion parts, respectively, and spaced apart from each other.

Each of the dam portions may include a black matrix disposed on the base substrate and a dam disposed the base substrate covering the black matrix.

Each of the dam portions may further include a reflection layer covering the dam.

The metal grid patterns may be directly disposed on the base substrate to be overlapped with the black matrix and may be covered with the black matrix.

A line width of each of the metal grid patterns may range from about 50 nm to about 600 nm, and a distance between the metal grid patterns may range from about 100 nm to about 600 nm.

The second display substrate may further include an in-cell polarization layer including wire grid patterns disposed between the liquid crystal layer and the color conversion layer.

A line width of each of the wire grid patterns may be less than that of each of the metal grid patterns, and a distance between the wire grid patterns may be less than that between the metal grid patterns.

A line width of each of the wire grid patterns may range from about 10 nm to about 50 nm, and a distance between the wire grid patterns may range from about 10 nm to about 100 nm.

The metal layer may have a first polarization axis that is substantially parallel to a first direction, and the in-cell polarization layer may have a second polarization axis that is substantially parallel to a second direction substantially perpendicular to the first direction.

In a thickness direction of the display panel, the second display substrate may be closer to the light source than to the first display substrate.

The first color light may be a blue light, and the externally incident light may be ambient light.

The second display substrate may further include a polarization layer including wire grid patterns disposed between the metal layer and the base substrate.

The second display substrate may further include a light control layer disposed between the color conversion layer and the liquid crystal layer, and the light control layer may be configured to absorb a second color light whose wavelength range is different from the specific wavelength range of the first color light.

According to another aspect of the invention, an exemplary method of fabricating a display panel includes the steps of forming on a base substrate first metal grid patterns and second metal grid patterns spaced apart from the first metal grid patterns with a gap region interposed therebetween, forming a black matrix in the gap region, forming a first dam portion, a second dam portion, and a third dam portion on the base substrate such that the first metal grid patterns are being interposed between the first and second dam portions and the second metal grid patterns are being interposed between the second and third dam portions, forming a first conversion layer including a first luminous body between the first dam portion and the second dam portion covering the first metal grid patterns, and forming a second conversion layer including a second luminous body between the second dam portion and the third dam portion to cover the second metal grid patterns.

The method may further include the steps of forming a reflection layer on the base substrate covering the first, second, and third dam portions.

The step of forming the first metal grid patterns and the second metal grid patterns may include forming a line width of each of them in a range from about 50 nm to about 600 nm and a distance between them in a range from about 100 nm to about 600 nm.

Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 2A is a cross sectional view, which is taken along line I-I' of FIG. 1A to illustrate a display device according to some exemplary embodiments of the invention.

FIGS. 5A, 5B, and 5C are cross sectional views illustrating a method of fabricating a display panel according to some exemplary embodiments of the invention.

FIG. 8A is a cross sectional view illustrating a display panel according to other exemplary embodiments of the invention.

Figure 1A:
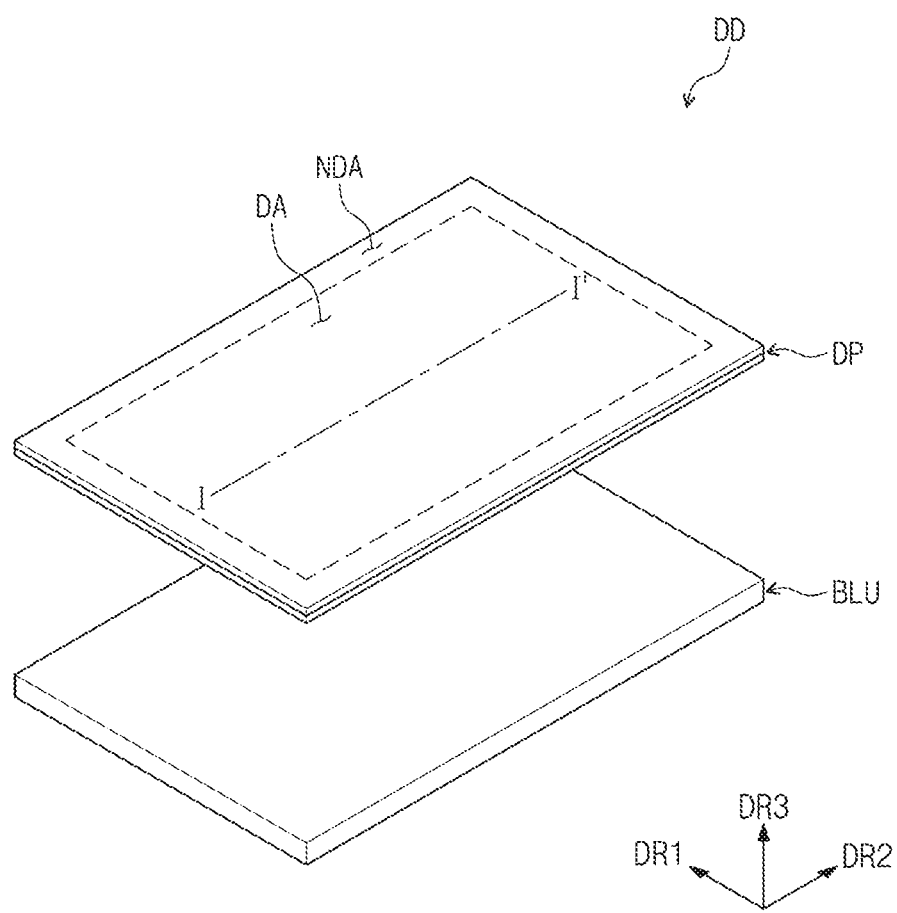
FIG. 1A is an exploded perspective view of a display device according to some exemplary embodiments of the invention.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalties between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, andz-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1B:
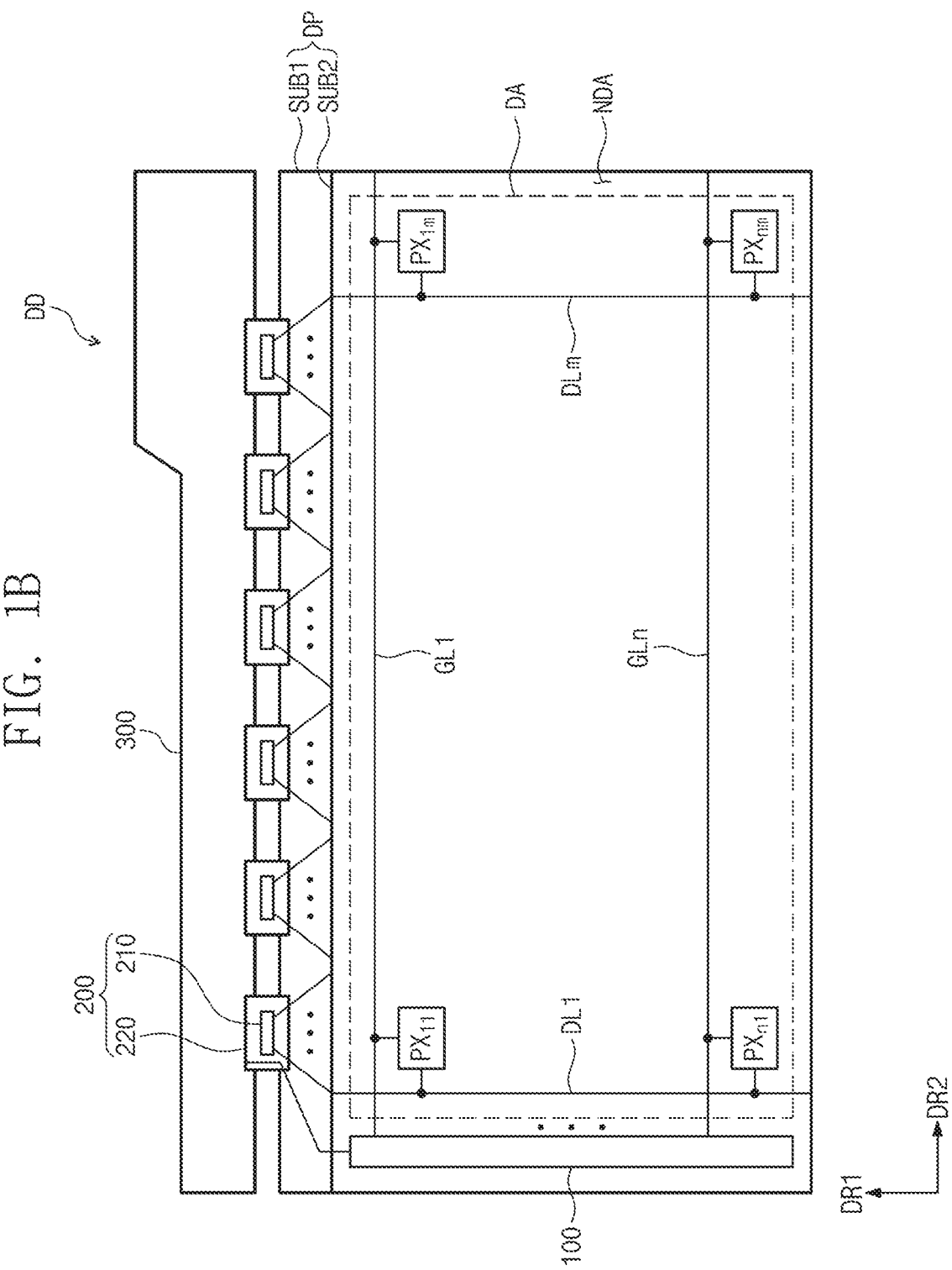
FIG. 1B is a block diagram of a display device according to some exemplary embodiments of the invention.

FIG. 1A is an exploded perspective view of a display device according to some exemplary embodiments of the invention. FIG. 1B is a block diagram of a display device according to some exemplary embodiments of the invention.

According to some exemplary embodiments of the invention, a display device DD of FIG. 1A may be used for tablet computers, smart phones, personal digital assistants, portable multimedia players, game machines, wristwatch-style electronic devices, or the like. In addition, the display device DD may be used for large-sized electronic devices (e.g., television sets or outdoor billboards) or small-sized or medium-sized electronic devices (e.g., personal computers, notebook computers, car navigation systems, or cameras).

Referring to FIG. 1A, the display device DD may include a display panel DP and a light source BLU, which is configured to provide light to the display panel DP. The display panel DP may be configured to display an image, and the light source BLU may be configured to generate light of a specific range of wavelengths producing a first color ("a first color light").

The light source BLU may be provided below the display panel DP to provide the first color light to the display panel DP. The first color light provided from the light source BLU may be a blue light. In certain exemplary embodiments, the first color light may be an ultraviolet light. For example, the light source BLU may be configured to generate light whose wavelength ranges from about 350 nm to about 450 nm.

The light source BLU may include a plurality of light-emitting devices. The light-emitting devices may be configured to emit a blue light, which will be used as the first color light. In certain exemplary embodiments, the light source BLU may further include a circuit board, which is used to supply electric power to the light-emitting devices. The light-emitting devices may be placed on the circuit board.

The first color light generated by the light source BLU may be provided to the display panel DP. The display panel DP may be provided on the light source BLU. The display panel DP may include a display region DA, which is provided to display an image, and a non-display region NDA, which is not used to display an image. The non-display region NDA may be provided adjacent to the display region DA. As an example, the non-display region NDA may be provided to surround the display region DA.

In some exemplary embodiments, the display panel DP may be one of a liquid crystal display panel, a plasma display panel, an electrophoretic display panel, a microelectromechanical system (MEMS) display panel, and an electrowetting display panel.

The description that follows will refer to an example in which the display panel DP is a liquid crystal display panel. The display panel DP may be classified into twisted-nematic, horizontal electric field, and vertical-alignment types, according to characteristics of its liquid crystal layer. In some exemplary embodiments, the display panel DP may be the vertical-alignment liquid crystal display panel, in which liquid crystal molecules are arranged in a specific direction when there is no electric field applied thereto and has a longitudinal axis perpendicular to a surface of the substrate.

The display panel DP may be provided to be substantially parallel to both of a first direction DR1 and a second direction DR2, e.g. to occupy a horizontal plane as shown in FIG. 1A. A normal direction of the display panel DP may be referred to as a third direction DR3. For example, the third direction DR3 may be substantially parallel to a thickness direction of the display panel DP. A front or top surface and a rear or bottom surface of each member may be distinguished, based on the third direction DR3. However, directions indicated by the first to third directions DR1, DR2, and DR3 may be relative, and in certain exemplary embodiments, they may be changed to indicate other directions.

Although the display device DD is illustrated as having a generally flat shape, the inventive concept is not limited thereto. In some exemplary embodiments, the display device DD may be a curved display device. For example, the display device DD may be provided to have a concavely- or convexly-curved shape. In certain exemplary embodiments, the display device may be provided to have a partially flat and a partially curved or bent shape.

In certain exemplary embodiments, the display device may be a flexible display device. For example, the display device may be a foldable display device or a rollable display device.

Referring to FIG. 1B, the display panel DP may include the display region DA, in which a plurality of pixels PX11-PXnm are provided, and the non-display region NDA, which is provided to enclose the display region DA.

A plurality of gate lines GL1-GLn and a plurality of data lines DL1-DLm may be provided on a first display substrate SUB1, and here, the data lines DL1-DLm may intersect the gate lines GL1-GLn. For convenience in illustration, only some of the gate lines GL1-GLn and some of the data lines DL1-DLm are illustrated in FIG. 1B.

The gate lines GL1-GLn may be connected to a gate driving circuit 100 and may be used to sequentially receive gate signals. The data lines DL1-DLm may be connected to a data driving circuit 200 and may be used to receive data signals (or data voltages), which are transmitted in the form of an analog signal.

Each of the pixels PX11-PXnm may be connected to a corresponding one of the gate lines GL1-GLn and to a corresponding one of the data lines DL1-DLm.

The gate driving circuit 100 and the pixels PX11-PXnm may be formed at the same time using the same thin-film process. For example, the gate driving circuit 100 may be integrated on the non-display region NDA using a process for forming an oxide silicon gate (OSG) driver circuit or an amorphous silicon gate (ASG) driver circuit on the display panel DP.

According to some exemplary embodiments of the invention, the gate driving circuit 100 is illustrated to be connected to left ends of the gate lines GL1-GLn, but the inventive concept is not limited thereto. For example, the display device may include two gate driving circuits, one of which is connected to left ends of the gate lines GL1-GLn, and the other of which is connected to right ends of the gate lines GL1-GLn. In certain exemplary embodiments, one of the two gate driving circuits may be connected to odd-numbered ones of the gate lines GL1-GLn, and the other may be connected to even-numbered ones of the gate lines GL1-GLn.

The data driving circuit 200 may be configured to receive data signals from a signal control unit (mounted on a circuit board 300 and to generate analog data signals based on the data signals.

The data driving circuit 200 may include a driving chip 210 and a flexible circuit board 220, on which the driving chip 210 is mounted. In some exemplary embodiments, the data driving circuit 200 may be configured to include a plurality of the driving chips 210 and a plurality of the flexible circuit boards 220. The flexible circuit board 220 may be provided to electrically connect the circuit board 300 to the first display substrate SUB1. The plurality of the driving chips 210 may be configured to provide the data signals to corresponding data lines, respectively.

As shown in FIG. 1B, the data driving circuit 200 may be provided in the form of a tape carrier package (TCP), but in certain exemplary embodiments, the data driving circuit 200 may be mounted on the first display substrate SUB1 in a chip-on-glass (COG) manner.

Figure 2B:
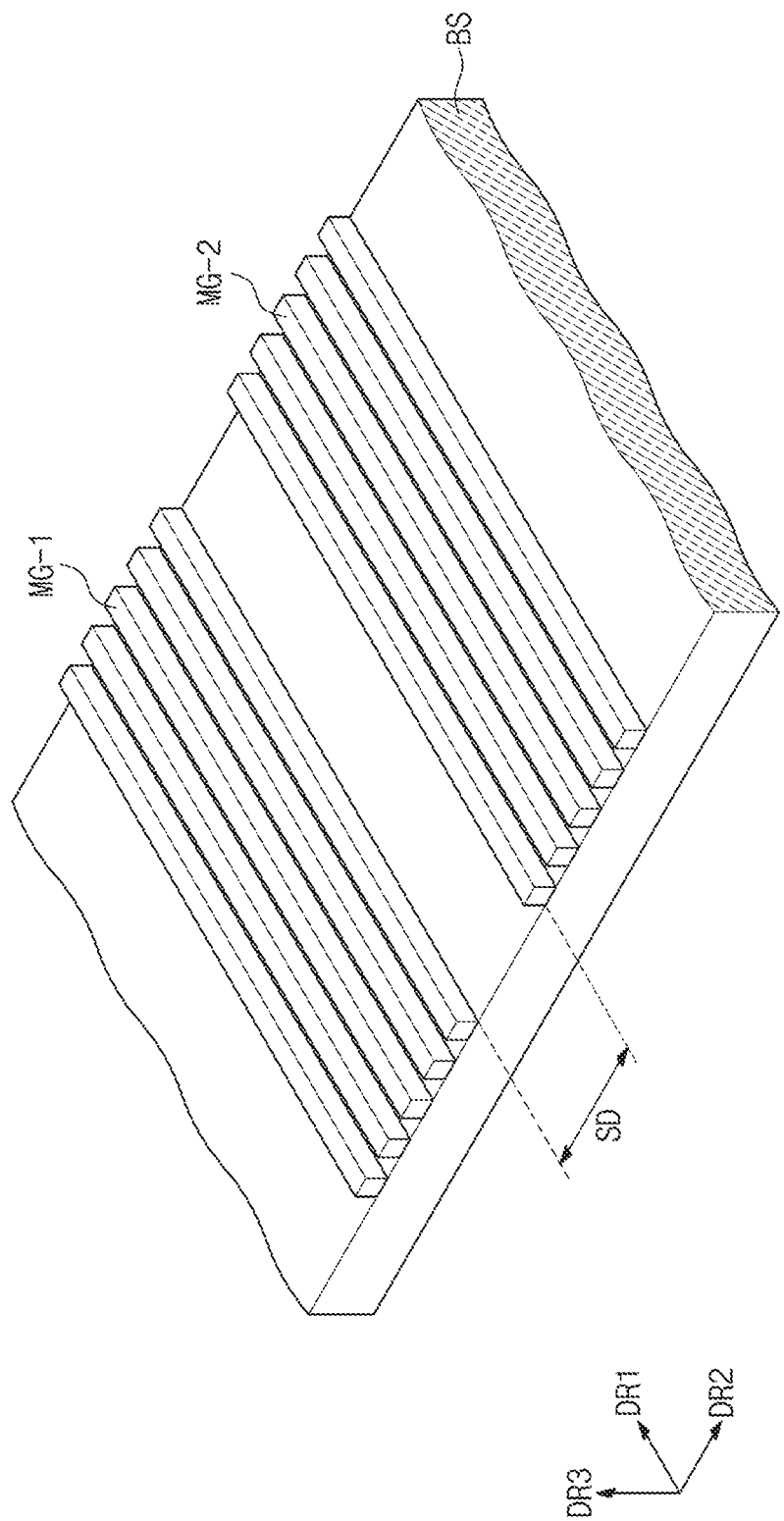
FIG. 2B is a partial, perspective view illustrating metal grid patterns of FIG. 2A.
Figure 2C:
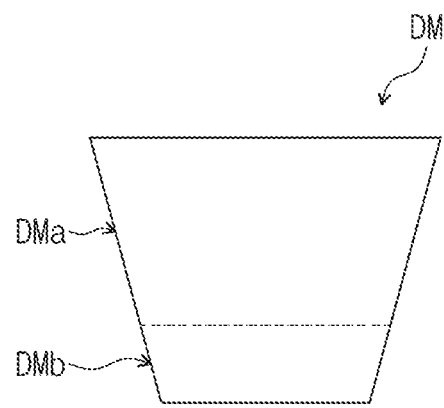
FIG. 2C is a cross sectional view illustrating a dam of FIG. 2A.
Figure 2D:
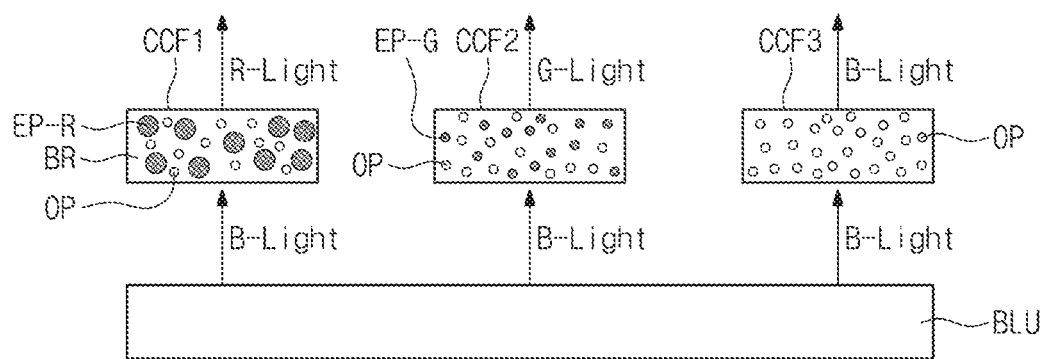
FIG. 2D is a diagram schematically illustrating optical characteristics of color conversion components according to some exemplary embodiments of the invention.

FIG. 2A is a cross sectional view, which is taken along line I-I' of FIG. 1A to illustrate a display device according to some exemplary embodiments of the invention. FIG. 2B is a partial, perspective view illustrating metal grid patterns of FIG. 2A. FIG. 2C is a cross sectional view illustrating a dam of FIG. 2A. FIG. 2D is a diagram schematically illustrating optical characteristics of color conversion components according to some exemplary embodiments of the invention.

Referring to FIG. 2A, a cross sectional view of the display panel DP overlapped with the display region DA is exemplarily illustrated. The display panel DP may include two opposite display substrates (e.g., a first display substrate SUB1 and a second display substrate SUB2) and a liquid crystal layer LC. The liquid crystal layer LC may be provided between the first display substrate SUB1 and the second display substrate SUB2. Hereinafter, the expression "overlapped" will be used to represent that two elements are overlapped with each other in the thickness direction of the display panel DP or in the third direction DR3, and includes elements that partially or completely overlap each other in the thickness direction.

The first display substrate SUB1 may include a pixel layer and a driving device layer. Here, the pixel layer may include the pixels PX11-PXnm described with reference to FIG. 1B and the driving device layer may include the gate driving circuit 100 and the data driving circuit 200 described with reference to FIG. 1B. In addition, the first display substrate SUB1 may include a base substrate, on which the pixel layer and the driving device layer are provided. Hereinafter, a base substrate of the first display substrate SUB1 will be referred to as a first base substrate.

Similarly, a base substrate of the second display substrate SUB2 will be referred to as a second base substrate BS, and each of the first base substrate and the second base substrate BS may be one of a polymer substrate, a plastic substrate, a glass substrate, or a quartz substrate. Each of the first base substrate and the second base substrate BS may be a transparent insulating substrate. The first base substrate and the second base substrate BS may be rigid or flexible.

The liquid crystal layer LC may be provided between the first base substrate and the second base substrate BS and may include a plurality of liquid crystal molecules LCL. The liquid crystal molecules LCL of the liquid crystal layer LC may be provided to have dielectric anisotropy. Various liquid crystal molecules including alkenyl or alkoxy liquid crystal compounds may be used for the liquid crystal layer LC, but the inventive concept is not limited thereto. In some exemplary embodiments, the liquid crystal molecule LCL may have a negative dielectric anisotropy, but the inventive concept is not limited thereto. For example, the liquid crystal layer LC may include the liquid crystal molecule LCL having a positive dielectric anisotropy.

The second display substrate SUB2 may include the second base substrate BS, a metal layer MGL, a color conversion layer CCL, dam portions DU, a light control layer YCL, and an in-cell polarization layer ICL.

The metal layer MGL may be provided on the second base substrate BS. The metal layer MGL may be directly provided on the second base substrate BS and may be formed by a patterning process.

The metal layer MGL may include metal grid patterns MG, which are provided on the second base substrate BS and are spaced apart from each other when viewed in a plan view. As shown in FIG. 2B, the metal grid patterns MG may extend in the first direction DR1 and may be arranged to be spaced apart from each other by a given distance in the second direction DR2. The metal grid patterns MG may be formed of or include a metallic material (e.g., gold (Au) or silver (Ag)).

The metal grid patterns MG may be provided on the second base substrate BS to be spaced apart from each other with the dam portion DU interposed therebetween. For example, the metal grid patterns MG may include a plurality of first metal grid patterns MG-1 and a plurality of second metal grid patterns MG-2, which are provided on the second base substrate BS and are spaced apart from each other by a space SD, and in this case, the dam portion DU may be disposed between the first metal grid patterns and the second metal grid patterns.

Each of the dam portions DU may be provided between a separated pair of the metal grid patterns MG to divide the metal grid patterns MG into a plurality of groups, each of which includes at least one metal grid pattern MG. The dam portions DU may include a black matrix BM, which is provided on the second base substrate BS and is used to prevent a light leakage phenomenon from occurring.

Each of the dam portions DU may include a dam DM that is provided to cover the black matrix BM. The dam DM may be provided on the second base substrate BS to cover the black matrix BM.

For example, as shown in FIG. 2C, the dam DM may include two layers (e.g., a first dam region DMa and a second dam region DMb), which are stacked in the third direction DR3. The first dam region DMa may be a portion of the dam DM, which is located adjacent to the second base substrate BS in the third direction DR3, whereas the second dam region DMb may be other portion of the dam DM, which extends from the first dam region DMa and is located adjacent to the liquid crystal layer LC.

The first dam region DMa may be provided to cover the black matrix BM and may be provided to have a thickness larger than that of the second dam region DMb. As an example, the first dam region DMa may have a trapezoidal shape, and the second dam region DMb may have a trapezoidal shape and may be provided to be in direct contact with the first dam region DMa.

In some exemplary embodiments, the first dam region DMa may include a hydrophilic material. For example, the first dam region DMa may be formed of or include siloxane. In the case where the first dam region DMa is formed of a hydrophilic material, luminous bodies may be formed to fill a region between two dam portions and on the second base substrate BS.

The second dam region DMb may include a hydrophobic material. For example, the second dam region DMb may be formed of or include a polymer. In the case where the second dam region DMb is formed of a hydrophobic material, it may be possible to prevent the luminous bodies from overflowing the dam portion DU.

In some exemplary embodiments, a color conversion layer CCF may be formed between the dam portions DU by an inkjet method. For example, a luminous body may be formed to fill a space between an adjacent pair of the dam portions DU, after the formation of the dam portions DU on the second base substrate BS. In this case, the second dam region DMb may be configured to prevent the luminous body from overflowing the dam portions DU, and this may make it possible to maintain the luminous body to a specific height.

Furthermore, each of the dam portions DU may include a reflection layer RM, which is provided on the second base substrate BS to cover the dam DM. The reflection layer RM may be formed of or include at least one of indium tin oxide (ITO) or silver (Ag). The reflection layer RM may be configured to reflect light scattered by the luminous body, and this may make it possible to increase optical efficiency of the second display substrate SUB2.

Referring back to FIG. 2A, the color conversion layer CCL may be provided between the liquid crystal layer LC and the second base substrate BS. The color conversion layer CCL may be provided on the second base substrate BS to cover the metal grid patterns MG. The color conversion layer CCL may include a luminous body, which is configured to absorb the first color light provided from the light source BLU and to emit light whose color is different from that of the first color light.

From example, referring to the exemplary embodiment of FIG. 2D, the color conversion layer CCL may include a first conversion part CCF1 including a first luminous body EP-R, a second conversion part CCF2 including a second luminous body EP-G, and a third conversion part CCF3, which is configured to allow the first color light to pass therethrough. Each of the first conversion part CCF1 and the second conversion part CCF2 may be overlapped with the metal grid patterns MG, and the third conversion part CCF3 may not be overlapped with the metal grid patterns MG. In other words, the metal grid patterns MG may not be provided on a region of the second base substrate BS overlapped with the third conversion part CCF3.

As shown in FIG. 2D, the first luminous body EP-R may be configured to absorb the blue light component of the first color light and to emit a red light, and the second luminous body EP-G may be configured to absorb the blue light component of the first color light and to emit a green light. Hereinafter, the red light will be referred to as 'a second color light', and the green light will be referred to as 'a third color light' but, of course, other colors may be employed. In other words, the first conversion part CCF1 may be a light-emitting region configured to emit the red light, and the second conversion part CCF2 may be a light-emitting region configured to emit the green light.

In some exemplary embodiments, the third conversion part CCF3 may be a region, in which no luminous body is provided. The third conversion part CCF3 may be configured to allow the first color light, which is provided from the light source BLU, to pass therethrough. For example, the third conversion part CCF3 may be a light-emitting region that is configured to emit the blue light.

The first conversion part to third conversion parts CCF1, CCF2, and CCF3 may include a base resin BR. The base resin BR may be a polymer resin. For example, the base resin BR may be acrylic resin, urethane resin, silicone resin, or epoxy resin. The base resin BR may be a transparent resin.

In addition, each of the first conversion part to third conversion parts CCF1, CCF2, and CCF3 may further include a scattering particle OP. The scattering particle OP may be TiO2- or silica-based nano particles. The scattering particle OP may be configured to scatter light, which is emitted from the luminous body, and then to emit the scattered light toward the outside of each conversion part. Even in the third conversion part CCF3 allowing an incident light to pass therethrough, the scattering particle OP may be configured to scatter the incident light and then to emit the scattered light toward the outside of the third conversion part CCF3.

First and second luminous bodies EP-R and EP-G (hereinafter, luminous bodies) included in the color conversion layer CCL may be a phosphor or quantum dot. For example, the color conversion layer CCL may include at least one of a phosphor or a quantum dot, which is used as the luminous bodies EP-R and EP-G.

As an example, the phosphor, which is used for the luminous bodies EP-R and EP-G, may be an inorganic phosphor. In the display device DD according to some exemplary embodiments of the invention, the phosphor for the luminous bodies EP-R and EP-G may be a green phosphor or a red phosphor.

The green phosphor may be at least one selected from the group consisting of YBO3:Ce3+,Tb3+, BaMgAl10O17: Eu2+, Mn2+, (Sr,Ca,Ba)(Al,Ga)2S4:Eu2+; ZnS:Cu,Al, Ca8Mg(SiO4)4Cl2:Eu2+,Mn2+; Ba2SiO4:Eu2+; (Ba,Sr)2SiO4:Eu2+; Ba2(Mg, Zn)Si2O7:Eu2+; (Ba,Sr)Al2O4: Eu2+, Sr2Si3O8.2SrCl2:Eu2+.

The red phosphor may be at least one selected from the group consisting of (Sr,Ca,Ba,Mg)P2O7:Eu2+, Mn2+, CaLa2S4:Ce3+; SrY2S4:Eu2+, (Ca,Sr)S:Eu2+, SrS:Eu2+, $Y_2O_3$:Eu3+,Bi3+; YVO4:Eu3+,Bi3+; Y2O2S:Eu3+,Bi3+; Y2O2S:Eu3+.

The inventive concept is not limited to the above-described phosphor materials for the color conversion layer CCL and other known phosphor materials may also be used for the color conversion layer CCL.

In certain exemplary embodiments, the luminous bodies EP-R and EP for the color conversion layer CCL may be a quantum dot. The quantum dot may be selected from the group consisting of II-VI compounds, III-V compounds, IV-VI compounds, IV elements, IV compounds, and combination thereof.

The II-VI compounds may be selected from the group consisting of binary compounds (e.g., including CdS, CdSe, CdTe, ZnS, ZnSe, ZnTe, ZnO, HgS, HgSe, HgTe, MgSe, MgS, and combination thereof), ternary compounds (e.g., including CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and combination thereof), and quaternary compounds (e.g., including HgZnTeS, CdZnSeS, CdZnSeTe, CdZnSTe, CdHgSeS, CdHgSeTe, CdHgSTe, HgZnSeS, HgZnSeTe, HgZnSTe, and combination thereof).

The III-V compounds may be selected from the group consisting of binary compounds (e.g., including GaN, GaP, GaAs, GaSb, AlN, AlP, AlAs, AlSb, InN, InP, InAs, InSb, and combination thereof), ternary compounds (e.g., including GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and combination thereof), and quaternary compounds (e.g., including GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and combination thereof). The IV-VI compounds may be selected from the group consisting of binary compounds (e.g., including SnS, SnSe, SnTe, PbS, PbSe, PbTe and combination thereof), ternary compounds (e.g., including SnSeS, SnSeTe, SnSTe, PbSeS, PbSeTe, PbSTe, SnPbS, SnPbSe, SnPbTe, and combination thereof), and quaternary compounds (e.g., including SnPbSSe, SnPbSeTe, SnPbSTe, and combination thereof). The IV elements may be selected from the group consisting of Si, Ge, and combination thereof. The IV compounds may include binary compounds selected from the group consisting of SiC, SiGe, and combination thereof.

Here, in each particle, the binary, ternary, or quaternary compound may be provided to have a substantially uniform concentration throughout the particle or to have a varying concentration distribution or spatially divided concentration states.

The quantum dot may be a core-shell structure including a core and a shell enclosing the core. In addition, a plurality of quantum dots may be provided to have a core/shell structure including one core quantum dot and other quantum dots enclosing the core quantum dot. At an interface between the core and the shell, a concentration of element contained in the shell may have a concentration gradient decreasing in a central direction.

The quantum dot may be a nanometer-scale particle. The quantum dot may be provided to have a light-emitting wavelength spectrum whose full width half maximum (FWHM) is less than about 45 nm (in particular, less than about 40 nm or in more particular, less than about 30 nm), and in this case, it may be possible to realize improved color purity or color reproduction characteristics. Furthermore, the quantum dot may be configured to allow light to be emitted radially, and thus, it may be possible to improve a viewing angle property.

In some exemplary embodiments, the quantum dot may be a spherical, pyramid-shaped, multi-arm, or cubic nano particle. In certain exemplary embodiments, the quantum dot may be shaped like a nano tube, a nano wire, a nano fiber, a nano plate-shaped particle, but other shapes and forms known in the art may be employed as well.

In some exemplary embodiments, the color of light emitted from the quantum dot may be changed depending on a particle size. In the case where the first luminous body EP-R and the second luminous body EP-G are quantum dots, the particle size of the first luminous body EP-R may be different from that of the second luminous body EP-G. For example, the particle size of the first luminous body EP-R may be smaller than that of the second luminous body EP-G. In this case, the first luminous body EP-R may emit light whose wavelength is shorter than that of the second luminous body EP-G.

Referring back to FIG. 2A, the dam portions DU may be provided between the first conversion part to third conversion parts CCF1, CCF2, and CCF3, which are spaced apart from each other, as described above. In other words, when viewed in a plan view, the dam portions DU may be provided to delimit the first to third conversion parts CCF1, CCF2, and CCF3, which are spaced apart from each other in the second direction DR2.

As described above, the first and second conversion parts CCF1 and CCF2 may be configured to absorb the first color light, which are emitted from the light source BLU, and to output a second color light and a third color light. Not only the first color light from the light source BLU but also an ambient light through the second base substrate BS may be incident upon the first and second conversion parts CCF1 and CCF2. The ambient light may refer to various kinds of lights which are incident into the display device DD from the outside. In this case, the ambient light may include a blue light, whose wavelength is the same as or similar to that of the first color light. If the blue component of the ambient light is incident upon the first and second conversion parts CCF1 and CCF2 through the second base substrate BS, the ambient light may be scattered by the luminous body. Thus, even when the light source BLU is not operated, a light leakage issue caused by the ambient light may occur.

In some exemplary embodiments, the metal layer MGL may be configured to block the ambient light, which is incident through the second base substrate BS, in a specific wavelength range. Here, a peak wavelength of the first color (e.g., blue) light may be included in the specific wavelength range.

In the case where the ambient light passes through the metal grid patterns MG of the metal layer MGL, other components of the ambient light, except for the blue light, may be incident into the conversion part. Luminous bodies included in each conversion part may be reacted by the blue light, and thus, the ambient light passing through the metal grid patterns MG may pass through the conversion part and may be incident into the light control layer YCL. The structure of the metal grid patterns MG will be described in more detail with reference to FIG. 4.

The light control layer YCL may be provided between the color conversion layer CCL and the liquid crystal layer LC. The light control layer YCL may be configured to allow the first color light to pass therethrough and to absorb a fraction of the second or third color light. As a result, the ambient light passing through the metal grid patterns MG may be absorbed by the light control layer YCL.

The display panel DP may include a polarization layer POL and an in-cell polarization layer ICL. The polarization layer POL may be configured to have a polarization axis parallel to a first direction, and the in-cell polarization layer ICL may be configured to have a polarization axis parallel to a second direction. For example, the first direction is perpendicular to the second direction.

As shown in FIG. 1B, the polarization layer POL may be provided on a bottom surface of a first base substrate. The polarization layer POL may be configured to pass light, whose polarization is substantially parallel to the polarization axis thereof or the first direction. The polarization layer POL may be a coating-type polarization layer or a polarization layer formed by a deposition process. The polarization layer POL may be formed by coating a material, in which a dichroic dye and a liquid crystal compound are contained.

The in-cell polarization layer ICL may be provided between the color conversion layer CCL and the liquid crystal layer LC. The in-cell polarization layer ICL may be configured to pass light, whose polarization is parallel to the polarization axis thereof or the second direction.

In some exemplary embodiments, the in-cell polarization layer ICL may be formed of or include at least one of metallic materials (e.g., aluminum (Al), silver (Ag), or molybdenum-titanium oxide (MTO)).

In some exemplary embodiments, the in-cell polarization layer ICL may include a wire grid pattern, which is overlapped with the display region DA and the non-display region NDA. In certain exemplary embodiments, the in-cell polarization layer ICL may be provided to be overlapped with only the display region DA or only a portion of the non-display region NDA. The wire grid pattern may be configured to allow light passing through the polarization layer POL to propagate in a direction that is substantially perpendicular to the specific direction.

In some exemplary embodiments, the metal layer MGL including the metal grid patterns MG may have the same polarization axis as that of the polarization layer POL. For example, the polarization axis of the metal grid patterns MG may be substantially perpendicular to that of the in-cell polarization layer ICL.

Most of the first color light, which passes through the in-cell polarization layer ICL, may be absorbed by the first and second conversion parts CCF1 and CCF2 and then may be emitted in the form of the second color light and the third color light. However, a fraction of the first color light may pass through the first and second conversion parts CCF1 and CCF2, without interaction with the luminous body, thereby being incident into the second base substrate BS.

According to some exemplary embodiments of the invention, the metal grid patterns MG may have a polarization axis substantially perpendicular to the wire grid patterns of the in-cell polarization layer ICL, and thus, the first color light, which passes through the in-cell polarization layer ICL, may not be allowed to pass through the metal layer MGL. Accordingly, it may be possible to suppress or prevent an afterimage phenomenon of a blue light, which may occur when the first color light is emitted from the first and second conversion parts CCF1 and CCF2.

Figure 3:
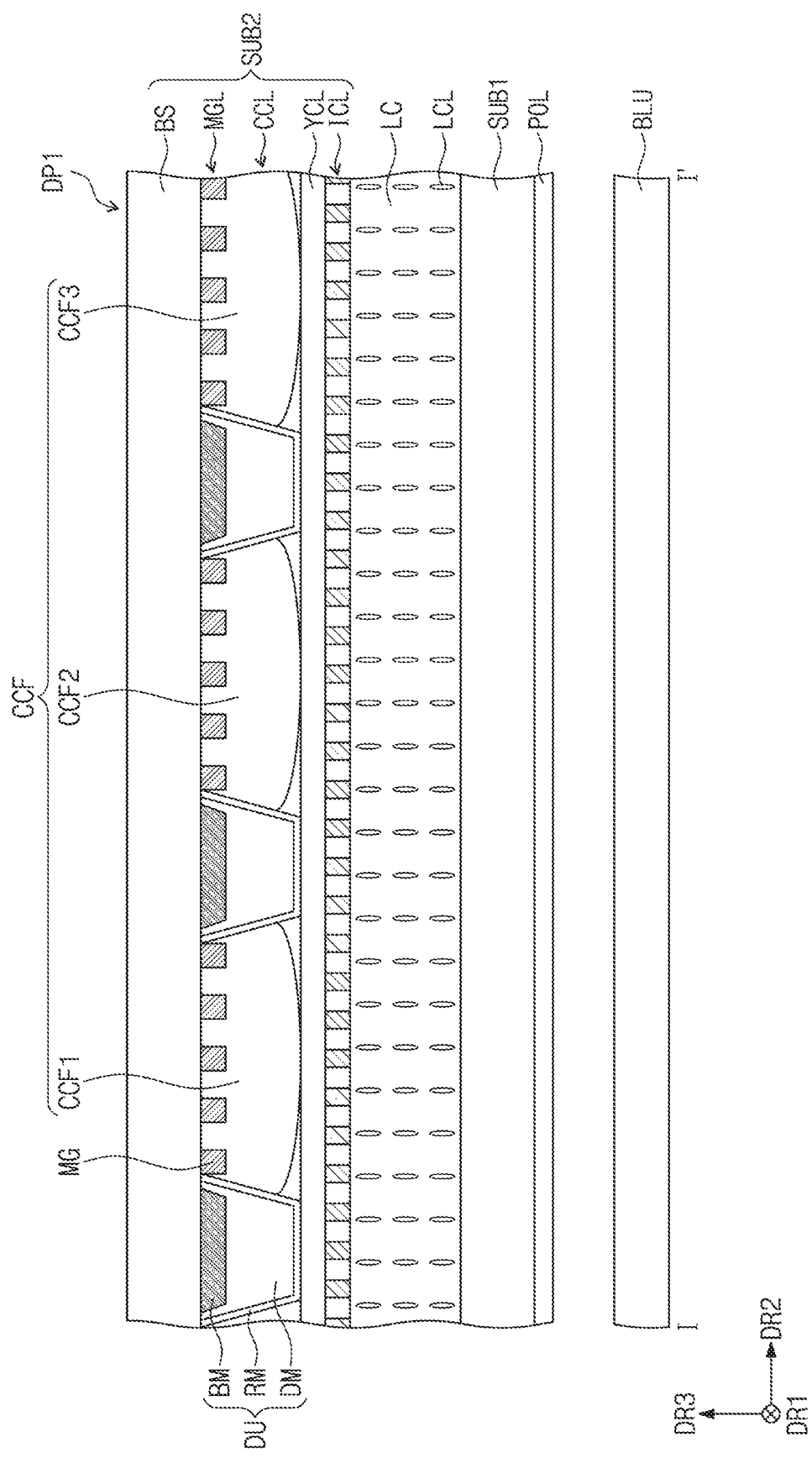
FIG. 3 is a cross sectional view, which is taken along line I-I' of FIG. 1A to illustrate a display device according to other exemplary embodiments of the invention.

FIG. 3 is a cross sectional view, which is taken along line I-I' of FIG. 1A to illustrate a display device according to other exemplary embodiments of the invention.

Referring to FIG. 3, a display panel DP1 may further include metal grid patterns MG, which are provided on the second base substrate BS and are overlapped with the third conversion part CCF3, in contrast with the display panel DP shown in FIG. 2A.

The metal grid patterns MG overlapped with the third conversion part CCF3 may have a polarization direction that is substantially perpendicular to that of the in-cell polarization layer ICL. However, the polarization state of light passing through the in-cell polarization layer ICL may be changed, due to the scattering particle OP (e.g., see FIG. 2D) included in the third conversion part CCF3. Accordingly, a blue light passing through the in-cell polarization layer ICL may pass through the third conversion part CCF3 and the metal grid patterns MG and may be emitted to the outside.

Figure 4:
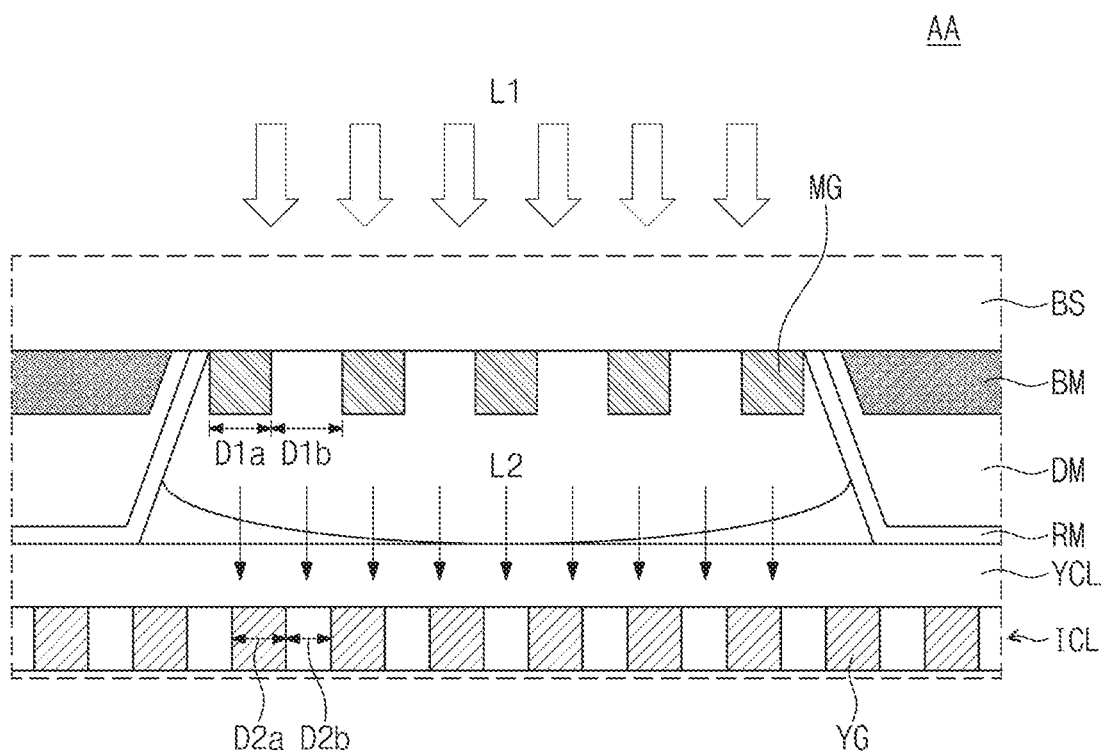
FIG. 4 is an enlarged sectional view of a portion 'AA' of FIG. 2A.

FIG. 4 is an enlarged sectional view of a portion 'AA' of FIG. 2A.

Referring to FIG. 4, an ambient light L1 (hereinafter, a first light) may be incident upon the metal grid patterns MG after passing through the second base substrate BS. As described above, the metal grid patterns MG may be configured to allow a second light L2, from which a blue component of the first light L1 is excluded, to pass therethrough. In other words, the metal grid patterns MG may be configured to prevent the blue component of the first light L1 from passing through.

In some exemplary embodiments, a line width D1a of each of the metal grid patterns MG may range from 50 nm to 600 nm. A distance D1b between two adjacent metal grid patterns MG may range from 100 nm to 600 nm. In detail, the metal grid patterns MG may be provided in the form of a filter layer that is realized based on a plasmonic structure shown in FIG. 2B. In the case where the polarization layer is constructed based on the plasmonic structure, the polarization layer may lead to a change in wavelength and polarization state, depending on a polarization angle of the incident ambient light. In particular, in the case where the metal grid patterns MG are provided to be in the above ranges for the line width and the spacing, a blue component of the incident light may be effectively blocked.

Thus, the second light L2, which passes through the metal grid patterns MG, may be incident upon the light control layer YCL, without the blue component. The second light L2 incident upon the light control layer YCL may be absorbed by the light control layer YCL.

In some exemplary embodiments, each of wire grid patterns YG of the in-cell polarization layer ICL may have a line width D2a ranging from 10 nm to 50 nm, and a distance D2b between two adjacent ones of the wire grid patterns YG may range from 10 nm to 100 nm. In other words, the line width D2a of each of the wire grid patterns YG may be less than that of each of the metal grid patterns MG, and the distance D2b between the two adjacent wire grid patterns YG may be less than that between the metal grid patterns MG.

Figure 5C:
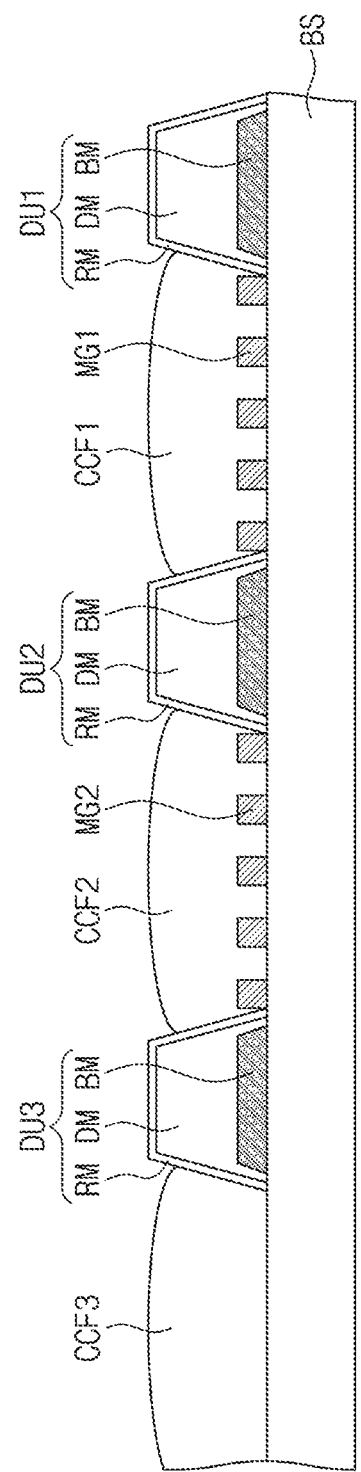

FIGS. 5A, 5B, and 5C are cross sectional views illustrating a method of fabricating a display panel according to some exemplary embodiments of the invention.

Referring to FIG. 5A, first metal grid patterns MG1 and second metal grid patterns MG2, which are spaced apart from the first metal grid patterns MG1, may be formed on a second base substrate BS (hereinafter, a base substrate). Here, the first metal grid patterns MG1 and the second metal grid patterns MG2 may be different portions of the same structure and may be formed by performing the same process on the base substrate BS. Thereafter, the black matrix BM may be formed between the metal grid patterns.

In some exemplary embodiments, each of the first metal grid patterns MG1 and the second metal grid patterns MG2 may be formed on the base substrate BS to have a line width ranging from 50 nm to 600 nm. In addition, the first metal grid patterns MG1 and the second metal grid patterns MG2 may be formed on the base substrate BS to be spaced apart from each other by a distance ranging from 100 nm to 600 nm.

Referring to FIG. 5B, a first dam portion DU1, a second dam portion DU2, and a third dam portion DU3 may be formed on the base substrate BS. The first dam portion DU1 and the second dam portion DU2 may be spaced apart from each other with the first metal grid patterns MG1 interposed therebetween, and the second dam portion DU2 and the third dam portion DU3 may be spaced apart from each other with the second metal grid patterns MG2 interposed therebetween.

For example, the dam DM of the first dam portion DU1 may be formed on the base substrate BS to cover the black matrix BM. Thereafter, the reflection layer RM of the first dam portion DU1 may be formed on the base substrate BS to cover the dam DM.

The dam DM of the second dam portion DU2 may be formed on the base substrate BS to cover the black matrix BM. The dam DM of the second dam portion DU2 may be spaced apart from the dam DM of the first dam portion DU1 by a specific distance, when viewed in a plan view. Thereafter, the reflection layer RM of the second dam portion DU2 may be formed on the base substrate BS to cover the dam DM.

The dam DM of the third dam portion DU3 may be formed on the base substrate BS to cover the black matrix BM. The dam DM of the third dam portion DU3 may be spaced apart from the dam DM of the second dam portion DU2 by a specific distance, when viewed in a plan view. In other words, the first to third dam portions DU1-DU3 may be sequentially arranged on the base substrate BS to be spaced apart from each other. Thereafter, the reflection layer RM of the third dam portion DU3 may be formed on the second base substrate BS to cover the dam DM.

Referring to FIG. 5C, a first ink layer may be formed on the base substrate BS to cover the first metal grid patterns MG1 disposed between the first dam portion DU1 and the second dam portion DU2. Here, the first ink layer may be the first conversion part CCF1 including the first luminous body EP-R described with reference to FIG. 2D.

A second ink layer may be formed to cover the second metal grid patterns MG2 disposed between the second dam portion DU2 and the third dam portion DU3. Here, the second ink layer may be the second conversion part CCF2 including the second luminous body EP-G described with reference to FIG. 2D.

In certain exemplary embodiments, a dam portion, which is spaced apart from the third dam portion DU3 by a specific distance, may be provided on the base substrate BS. In this case, a third ink layer may be formed between the third dam portion DU3 and the dam portion. Here, the third ink layer may not include an additional luminous body and may be the third conversion part CCF3, in which scattering particle is provided.

Figure 6:
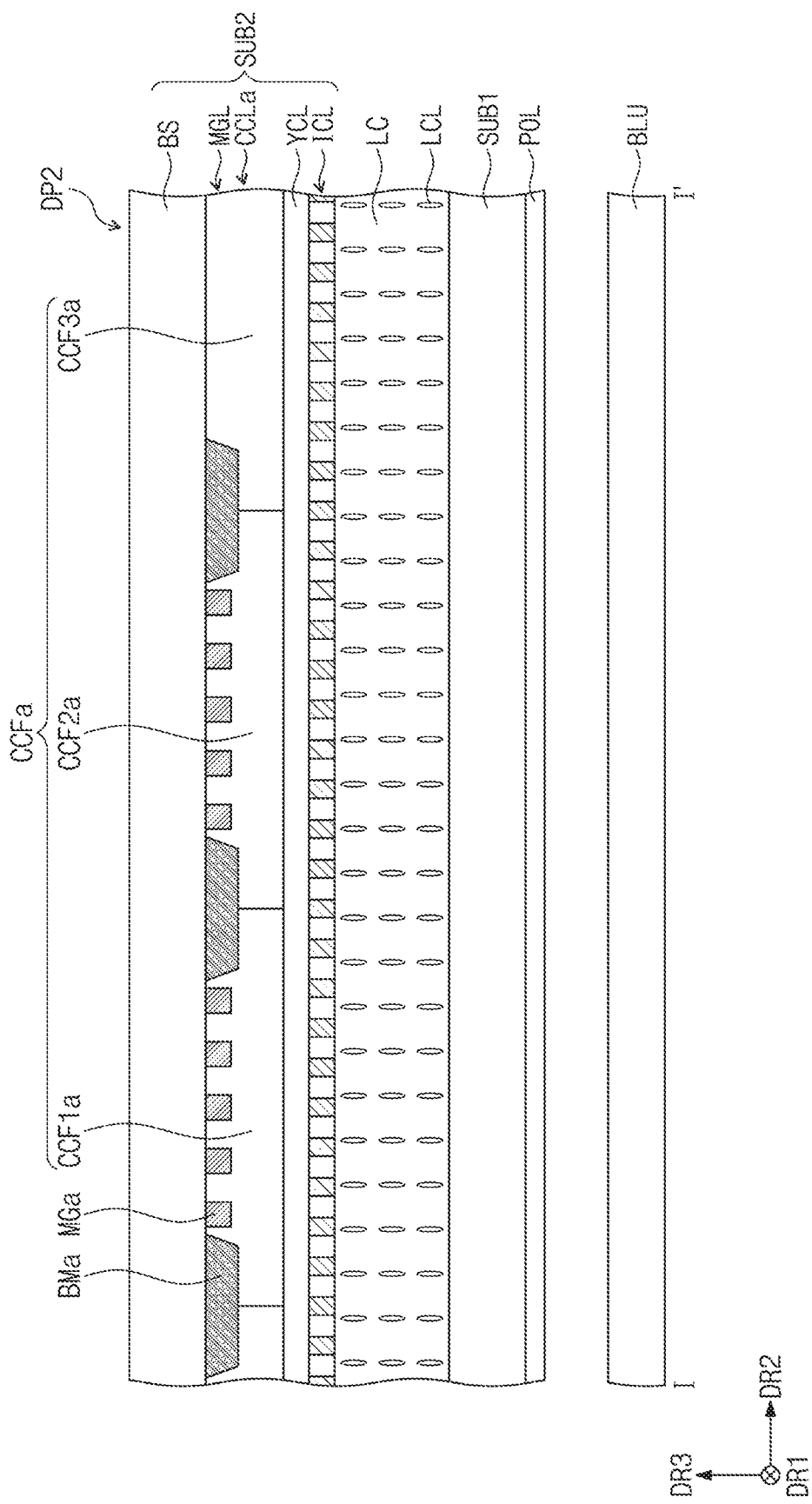
FIG. 6 is a cross sectional view illustrating a display panel according to other exemplary embodiments of the invention.

FIG. 6 is a cross sectional view illustrating a display panel according to other exemplary embodiments of the invention. In a display panel DP2 of FIG. 6, the dam portion DU of the display panel DP of FIG. 2A may be omitted. Except for this difference, others elements may be configured to have substantially the same features as those of FIG. 2A and may be identified by the same reference number without repeating the same description thereof to avoid redundancy.

Referring to FIG. 6, a color conversion layer CCLa may include a first conversion part CCF1a, a second conversion part CCF2a, and a third conversion part CCF3a, which are spaced apart from each other in the second direction DR2. The first to third color conversion parts CCF1a to CCF3a may be spaced apart from each other by the black matrix BM. In other words, the black matrix BM may be provided to delimit adjacent color conversion parts.

In some exemplary embodiments, the first to third color conversion parts CCF1a to CCF3a may be configured to have substantially the same structures as the first to third conversion parts CCF1 to CCF3 described with reference to FIG. 2C.

Figure 7:
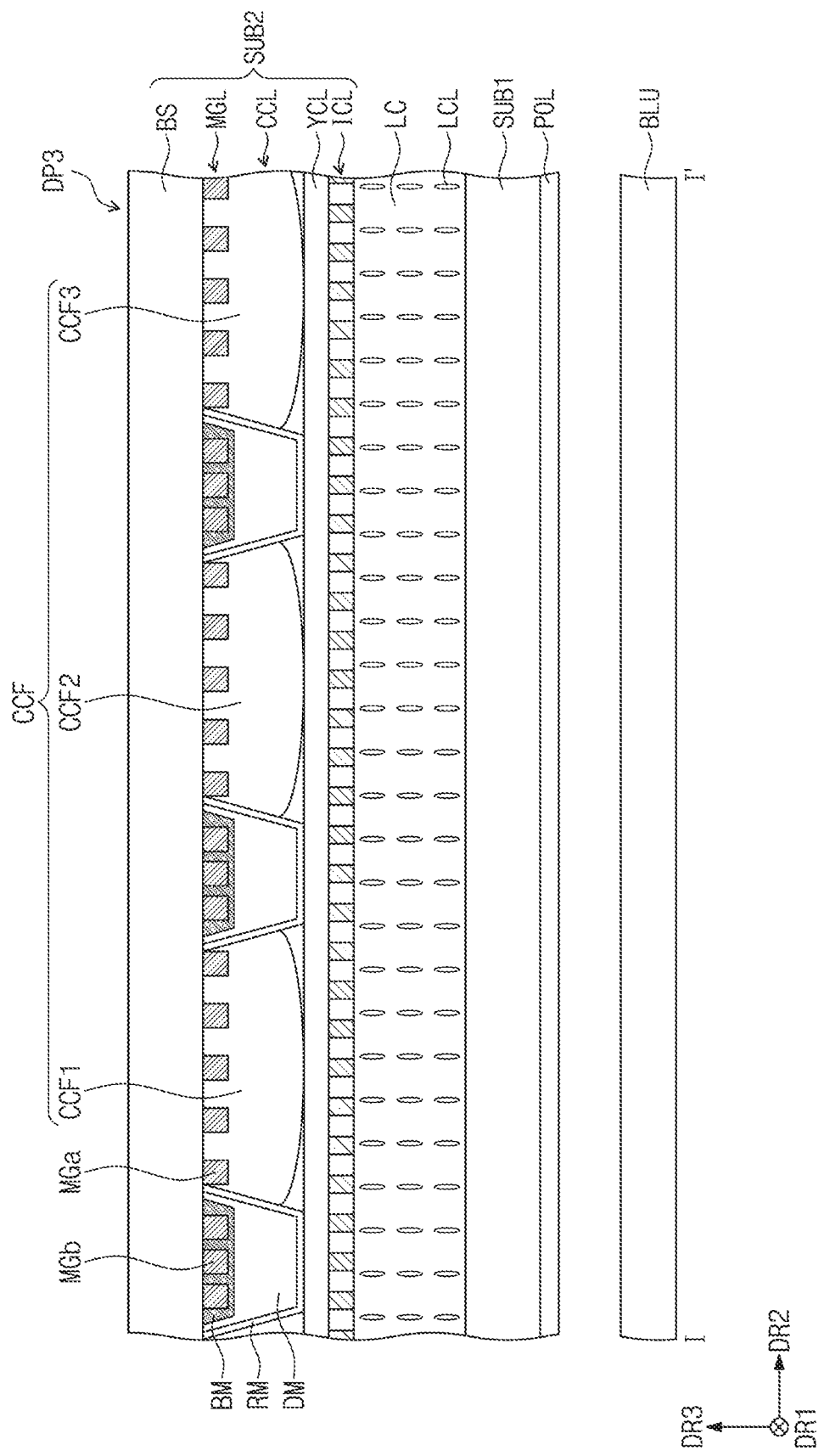
FIG. 7 is a cross sectional view illustrating a display panel according to other exemplary embodiments of the invention.

FIG. 7 is a cross sectional view illustrating a display panel according to other exemplary embodiments of the invention. Compared with the display panel DP of FIG. 2A, the display panel DP3 of FIG. 7 may be configured to further include sub-metal grid patterns MGb. Except for this difference, others elements may be configured to have substantially the same features as those of FIG. 2A and may be identified by the same reference number without repeating the same description thereof to avoid redundancy.

Referring to FIG. 7, the sub-metal grid patterns MGb may be provided on the second base substrate BS to be overlapped with the black matrix BM in the third direction DR3. For example, the sub-metal grid patterns MGb may be patterned using a part of the process described with reference to FIG. 5A (e.g., by the same process as that for the metal grid patterns MGa). Thereafter, the black matrix BM may be formed on the second base substrate BS to cover the sub-metal grid patterns MGb.

Figure 8B:
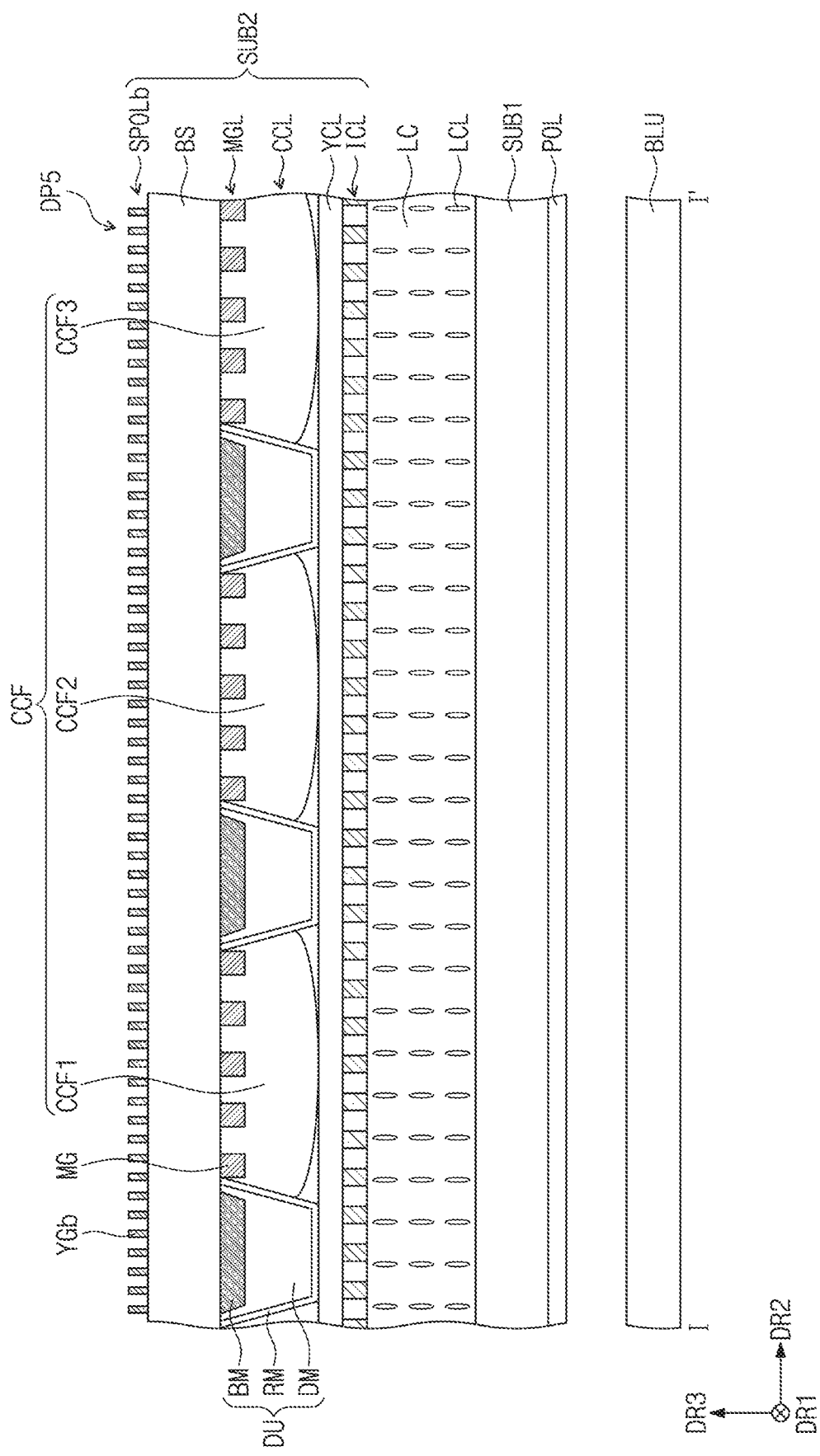
FIG. 8B is a cross sectional view illustrating a display panel according to other exemplary embodiments of the invention.

FIG. 8A is a cross sectional view illustrating a display panel according to other exemplary embodiments of the invention. FIG. 8B is a cross sectional view illustrating a display panel according to other exemplary embodiments of the invention.

Compared with the display panel DP of FIG. 2A, the display panel DP4 of FIG. 8A may be configured to further include a sub-polarization layer SPOLa. Except for this difference, others elements may be configured to have substantially the same features as those of FIG. 2A and may be identified by the same reference number without repeating the same description thereof to avoid redundancy.

In the illustrated exemplary embodiments, the sub-polarization layer SPOLa may be provided between the second base substrate BS and the metal layer MGL. The sub-polarization layer SPOLa may include wire grid patterns YGa. The wire grid patterns YGa may be provided on the rear surface of the second base substrate BS. Here, the liquid crystal layer LC may be closer to the rear surface of the second base substrate BS than to the top surface of the second base substrate BS. As described above, in the case where the polarization layer is constructed based on the plasmonic structure, it may be possible to change the wavelength and the polarization state, depending on a polarization angle of an incident ambient light.

The wire grid patterns YGa of the sub-polarization layer SPOLa may be used to adjust the angle of incident ambient light, and this may make it possible to allow light, whose polarization component is changed, to be incident into the metal layer MGL. As a result, the metal layer MGL may be used to more effectively block the blue component of light to be incident through the sub-polarization layer SPOLa.

A display panel DP5 of FIG. 8B may differ from the display panel DP4 of FIG. 8A in terms of positions of the wire grid patterns YGb of FIG. 8B and the wire grid patterns YGa of FIG. 8A, and except for this difference, the display panel DP5 may be substantially the same as the display panel DP4.

In detail, a sub-polarization layer SPOLb may be provided on the second base substrate BS. The sub-polarization layer SPOLb may include the wire grid patterns YGb, which are arranged on the top surface of the second base substrate BS.

According to some exemplary embodiments of the invention, metal grid patterns covered with a color conversion layer may be provided on a base substrate. The metal grid patterns may be configured to allow other components of ambient light, except for a blue component, to pass therethrough. Accordingly, it may be possible to prevent the ambient light incident into the color conversion layer from optically interacting with a luminous body and to prevent the ambient light from causing an afterimage phenomenon.

In addition, the metal grid patterns may be provided on the base substrate, without an additional mask process, and thus, it may be possible to improve process efficiency.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device, comprising:
   a display panel; and
   a light source to irradiate to the display panel a first color light having a peak wavelength within a specific wavelength range,
   wherein the display panel comprises:
   a first display substrate and
   a second display substrate facing the first display substrate and,
   wherein the second display substrate comprises:
   a base substrate; and
   a metal layer having metal grid patterns spaced apart from each other with substantially uniform pitch and disposed on the base substrate to block a fraction of an externally incident light in the specific wavelength range, and
   a color conversion layer disposed on the base substrate covering the metal grid patterns, and filling a space between the metal grid patterns,
   wherein the color conversion layer includes a luminous body configured to absorb the first color light and emit color light whose color is different from that of the first color light and includes a base resin and a scattering particle.

2. The display device of claim 1, wherein the color conversion layer comprises:
   a first conversion part including a first luminous body configured to absorb the first color light and emit a second color light;
   a second conversion part including a second luminous body configured to absorb the first color light and emit a third color light; and
   a third conversion part configured to allow the first color light to pass through.

3. The display device of claim 2, wherein the metal grid patterns comprise:
   first metal grid patterns directly disposed on the base substrate and overlapping the first conversion part; and
   second metal grid patterns directly disposed on the base substrate and overlapping the second conversion part.

4. The display device of claim 3, wherein the metal grid patterns further comprise a third metal grid pattern directly disposed on the base substrate and overlapping the third conversion part.

5. The display device of claim 2, wherein the second display substrate further comprises a plurality of dam portions disposed between the first, second, and third conversion parts, respectively, and spaced apart from each other.

6. The display device of claim 5, wherein each of the plurality of dam portions comprises:
   a black matrix disposed on the base substrate; and
   a dam disposed on the base substrate covering the black matrix.

7. The display device of claim 6, wherein each of the plurality of dam portions further comprises a reflection layer covering the dam.

8. The display device of claim 6, wherein the metal grid patterns are directly disposed on the base substrate and are covered with the black matrix.

9. The display device of claim 6, wherein the black matrix is provided to delimit adjacent the first, second, and third color conversion parts, respectively.

10. The display device of claim 1, wherein a line width of each of the metal grid patterns ranges from about 50 nm to about 600 nm, and
    a distance between two adjacent metal grid patterns of the metal grid patterns ranges from about 100 nm to about 600 nm.

11. The display device of claim 1, wherein the display panel further comprises a liquid crystal layer disposed between the first display substrate and the second display substrate, and wherein the second display substrate further comprises an in-cell polarization layer including wire grid patterns disposed between the liquid crystal layer and the color conversion layer.

12. The display device of claim 11, wherein a line width of each of the wire grid patterns is less than a line width of each of the metal grid patterns, and
a distance between two adjacent wire grid patterns of the wire grid patterns is less than a distance between two adjacent metal grid patterns of the metal grid patterns.

13. The display device of claim 11, wherein a line width of each of the wire grid patterns ranges from about 10 nm to about 50 nm, and
a distance between two adjacent wire grid patterns of the wire grid patterns ranges from about 10 nm to about 100 nm.

14. The display device of claim 11, wherein the metal layer has a first polarization axis that is substantially parallel to a first direction, and
the in-cell polarization layer has a second polarization axis that is substantially parallel to a second direction substantially perpendicular to the first direction.

15. The display device of claim 1, wherein, in a thickness direction of the display panel, the first display substrate is closer to the light source than to the second display substrate.

16. The display device of claim 1, wherein the first color light is a blue light and the externally incident light is ambient light.

17. The display device of claim 1, wherein the second display substrate further comprises a polarization layer including wire grid patterns provided between the metal layer and the base substrate.

18. The display device of claim 1, wherein the second display substrate further comprises a light control layer provided between the color conversion layer and the first display substrate, and
the light control layer is configured to absorb a second color light whose wavelength range is different from the specific wavelength range of the first color light.

* * * * *